United States Patent Office 3,620,099
Patented Nov. 16, 1971

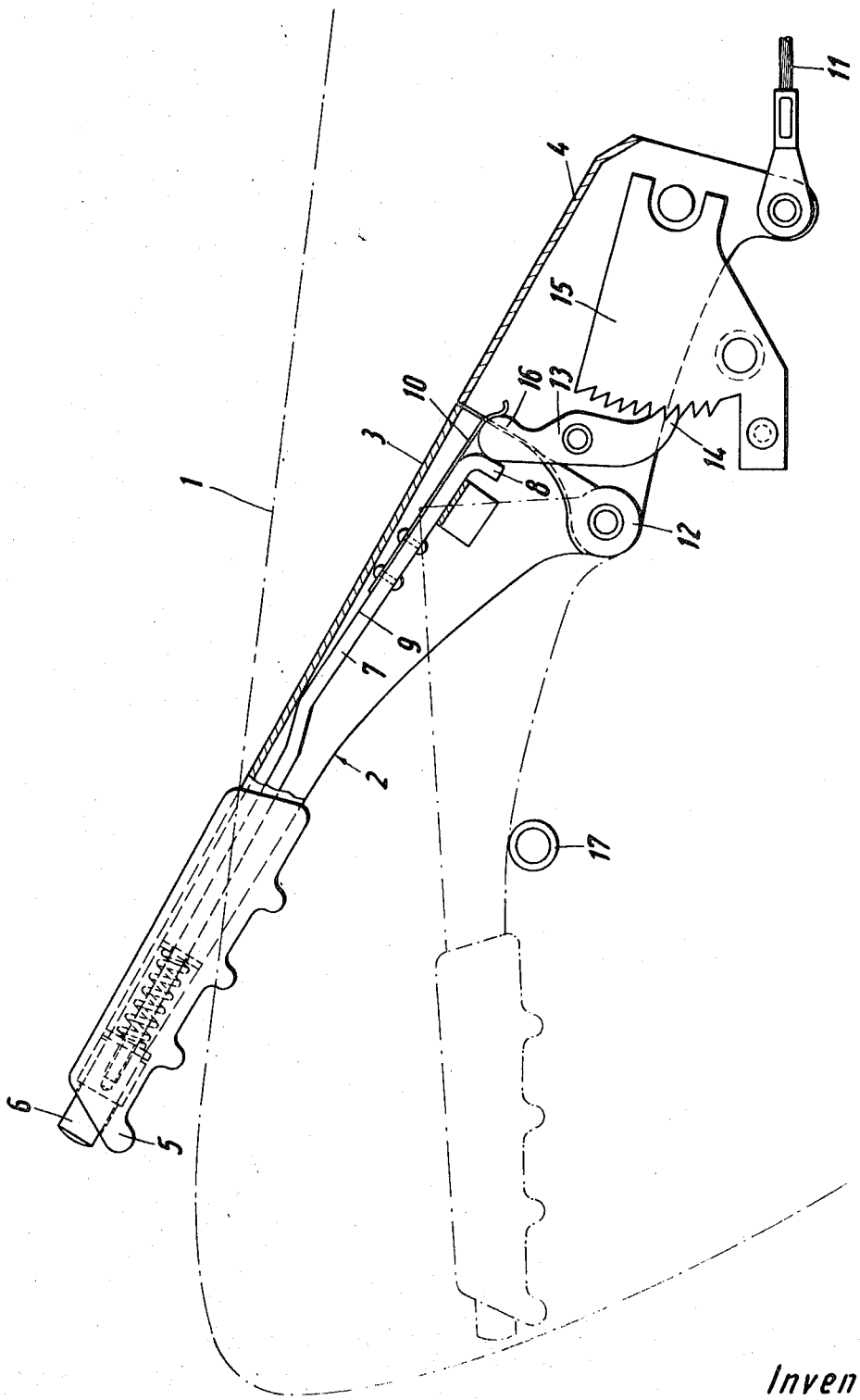

3,620,099
HINGE OPERATING LEVER FOR USE IN VEHICLES, PARTICULARLY AS A HAND BRAKE LEVER FOR AUTOMOTIVE VEHICLES
Erich Stotz, Rommelshausen, Germany, assignor to Firma Dr.-Ing. h.c.F. Porsche K.G., Stuttgart-Zuffenhausen, Germany
Filed June 2, 1969, Ser. No. 829,172
Claims priority, application Germany, July 9, 1968, P 17 55 911.4
Int. Cl. G05g 1/04
U.S. Cl. 74—524          19 Claims

ABSTRACT OF THE DISCLOSURE

A hinged operating lever which can be used as a hand brake in an automotive vehicle has two hingedly connected parts, the first of which constitutes a handle. A pawl is rotatably mounted on the second part and is engageable in a detent plate to secure the hand brake. The pawl is also releasable by a control linkage comprising a control rod and a leaf spring which thereby permits the handle to be folded down out of the way of a passenger when exiting from the vehicle by the application of hand pressure to the handle.

BACKGROUND OF THE INVENTION

The present invention relates to a hinged and foldable operating lever for vehicles, more particularly, a hand brake lever for automotive vehicles, consisting of two hingedly connected parts and being provided with a pawl and detent means releasably actuated by a control or operating linkage.

Operating levers which have means for folding the lever sections are well known. One of these known folding means consists of a compression spring mounted in the upper section of the operating lever, which spring is connected with a chain and affixed in the lower section of the operating lever. The upper section of the operating lever can be inserted in a sleeve or casing mounted at the lower section of the operating lever and is retained in this positon by the force of the spring. The disadvantage exhibited by this device is that a relatively large force must be extended in order to fold over the operating lever. Furthermore, the operating lever of this construction is, of necessity, heavy and awkward to handle because of this folding means. The same is also true for an operating lever which is retained in a plug-in connection by means of an elastic sleeve surrounding the folding device. A further known device consists of an operating lever which can be pushed into a tubular sleeve, connected with the part to be operated, during non-use. This construction has the disadvantage, however, that the operating lever occupies a large amount of space and is of a construction which requires complicated manufacture.

SUMMARY OF THE INVENTION

The present invention aims at avoiding the aforementioned disadvantages and provides a hinged and foldable operating lever, wherein substantially already existing components can be employed but which is distinguished by a simple folding procedure.

According to the present invention, the aforementioned problems are solved by providing that the lever part comprising the handle is connected with the adjoining lever part by means of a locking or safety catch mechanism, the locking force of which can be overcome by pressure. As a result, a simple manipulation of the operating lever is obtainable. Therefore, the lever is further distinguished by a construction which is completely safe in operation.

The locking or safety catch mechanism is preferably formed by the control for operating linkage and a retaining spring which can be connected flush with the pawl. A secure engagement for the lever part comprising the handle is thereby insured, with a minimum number of structural components. The retaining spring consists, advantageously, of a leaf spring whose free end surrounds the head of the pawl. In this construction, a retaining spring is provided which can be manufactured in a simple manner and which insures, by its flush connection with the pawl, that the locking unit has a flawless mode of operation. The lever part comprising the handle can be folded on a stop or abutment mounted on the vehicle, for example, at the seat frame. This allows the operating lever to be available and ready to be grasped at any time and further makes it possible for a passenger to enter and alight from the vehicle undisturbed.

Accordingly, it is an object of the present invention to provide a hinged and foldable operating lever for vehicles, especially a hand brake lever for automotive vehicles, which avoids by simple and effective means the aforementioned drawbacks and disadvantages encountered with the prior art devices.

Another object of the present invention resides in an operating lever of the type described above which employs a simple folding procedure.

A further object of the present invention resides in an operating lever of the type described above which insures a safe and flawless mode of operation.

A still further object of the present invention resides in an operating lever of the type described above which is available and ready to be grasped by a passenger at any time and yet which makes it possible for a passenger to enter and leave from the vehicle undisturbed.

BRIEF DESCRIPTION OF THE DRAWING

These and further objects, features and advantages of the present invention will become more obvious from the following description when taken in connection with the accompanying drawing which shows, for the purposes of illustration only, one embodiment in accordance with the present invention, and wherein:

The sole figure is a longitudinal sectional view of a hand brake lever for an automotive vehicle with the folded-down position of the lever part which comprises the handle being shown in phantom lines.

DETAILED DESCRIPTION OF THE DRAWING

Referring now to the sole figure, there is illustrated a driver's seat 1 of an automotive vehicle, in the immediate vicinity of which is disposed a hand brake lever designated generally by the numeral 2 and which consists of two parts 3 and 4. The first part 3 comprises the lever handle 5 and has a release button 6 in connection with a spring loaded control rod 7. The free end 8 of the control rod 7 is bent at a right angle to the longitudinal direction of the control rod and is provided with a retaining spring 10 on the upper side 9 thereof. The second part 4 of the lever is connected with a brake rope and pulley or tackle arrangement 11 and is connected with the first lever part 3 which comprises the handle 5 by means of a hinge or swivel joint 12 disposed on the underside of both lever parts 3 and 4. The second lever part 4 also contains a rotatably mounted pawl 13 which has serrations 14 on one end thereof. These serrations can engage an index or detent plate 15. The other end of the pawl 13 which is disposed opposite to the teeth or serrations 14 comprises a head 16 which rests against the free bent end 8 of the control rod 7 and is maintained in this position by the shape of the retaining spring 10. Due to the pressure of the spring-loaded control rod 7, the serrations 14 of the pawl 13 are held in engagement with the index or detent plate 15.

In the full line position of the hand brake lever shown in the drawing, the brake is in a secured position. In order to provide an unencumbered egress for a passenger occupying seat 1, the first lever part 3 which comprises the handle 5 can be lowered onto the stop or abutment 17 as shown in phantom lines. To accomplish this, it is only necessary to exert a certain, vertically directed pressure on the handle 5. As a result, the force of the retaining spring 10 is overcome, and the first lever part 3 pivots about the axis of the hinge 12 into the position indicated by the phantom lines.

To release the hand brake, it is only necessary that the first lever part 3 be lifted until the retaining spring 10 is engaged over the head 16 of the pawl 13. After the first lever part 3 has been further tightened, the release button 6 is pressed inwardly and displaces the spring-loaded control rod 7. When the spring-loaded control rod is so displaced, the free bent end 8 thereof frees the pawl 13 from the serrations and detents of the index plate 15, thereby freeing the hand brake lever 2 which can then be lowered into the released position.

While I have shown and described one embodiment in accordance with the present invention, it is understood that the same is not limited to the illustrated embodiment of the hand brake lever but is susceptible to numerous changes and modifications as known to a person skilled in the art. Furthermore, the operating lever can be disposed in a vehicle in a multitude of different positions. Therefore, I do not wish to be limited to the details shown and descirbed herein but intend to cover all such changes and modifications as are encompassed by the scope of the invention.

I claim:

1. A hinged operating lever for use in vehicles, especially as a hand brake in an automotive vehicle, having a plurality of operatively connected parts, one of said parts constituting a handle, means including a pawl operatively associated with the lever and actuable by a control linkage for selectively releasing the lever from a secured position, characterized in that there is provided means for applying a locking force connection between the hingedly connected lever parts which can be overcome by hand pressure so as to permit one of the lever parts to be swung about the hinged connection while the lever is still in the secured position, wherein the means for applying the locking force connection consists of the control linkage and a retaining means associated therewith.

2. A hinged operating lever according to claim 1, wherein the retaining means is connected flush with the pawl.

3. A hinged operating lever according to claim 1, wherein the retaining means consists of a leaf spring, and the free end of the leaf spring surrounds the head of the pawl.

4. A hinged operating lever for use in vehicles, especially as a hand brake in an automotive vehicle, having a plurality of operatively connected lever parts, and means operatively associated with the lever and actuable by a control linkage for selectively releasing the lever from a secured position, characterized in that there is provided means for applying a locking force connection between the hingedly connected lever parts which can be overcome by hand pressure so as to permit one of the lever parts to be swung about the hinged connection while the lever is still in the secured position, wherein an abutment is mounted on the vehicle, said one of the lever parts is a handle adapted to be folded down onto the abutment, and the means for selectively releasing the lever includes a pawl.

5. A hinged operating lever according to claim 4, wherein the abutment is mounted at the vehicle seat frame.

6. A hinged operating lever according to claim 4, wherein the means for applying the locking force connection consists of the control linkage and a retaining means associated therewith.

7. A hinged operating lever according to claim 6, wherein the abutment is mounted at the vehicle seat frame.

8. A hinged operating lever according to claim 6, wherein the retaining means consists of a leaf spring, and the free end of the leaf spring surrounds the head of the pawl.

9. A hinged operating lever according to claim 8, wherein the leaf spring is connected flush with the head of the pawl.

10. A hinged operating lever according to claim 1, wherein the means for selectively releasing the lever includes detent means selectively engageable with said pawl when it is desired to secure the lever.

11. A hinged operating lever according to claim 1, wherein said one of the lever parts constitutes a handle and the releasable means includes a button.

12. A hinged operating lever according to claim 11, wherein the other lever part is connected to a hand brake tackle arrangement.

13. A hinged operating lever according to claim 12, wherein the releasable button and the control linkage are operatively associated with the handle, and the pawl is operatively associated with the other lever part.

14. A hinged operating lever according to claim 11, wherein an abutment is mounted at the vehicle seat frame and the handle is adapted to be folded down onto the abutment.

15. A hinged operating lever according to claim 14, wherein the means for applying the locking force connection consists of the control linkage and a retaining mean associated therewith.

16. A hinged operating lever according to claim 15, wherein the retaining means consists of a leaf spring and the free end of the leaf spring surrounds the head of the pawl and is connected flush therewith.

17. A hinged operating lever according to claim 16, wherein the control linkage essentially consists of a control rod, one end of the control rod being operatively connected with the releasable button and the other end having a right-angle bent portion thereon against which the pawl rests.

18. A hinged operating lever according to claim 2, wherein an abutment is mounted on the vehicle and said one of the lever parts is a handle adapted to be folded down upon the abutment.

19. A hinged operating lever according to claim 3, wherein an abutment is mounted on the vehicle and said one of the lever parts is a handle adapted to be folded down onto the abutment.

References Cited

UNITED STATES PATENTS

| 1,161,786 | 11/1915 | Nelson | 74—524 |
| 1,524,898 | 2/1925 | Whiter | 74—524 |
| 3,298,245 | 1/1967 | Cross | 74—538 X |
| 3,314,716 | 4/1967 | Sommerer | 74—538 X |

FOREIGN PATENTS

| 165,075 | 9/1955 | Australia | 74—524 |

OTHER REFERENCES

Page, V. W: The Model T Ford Car. N.Y., The Norman W. Henly Publishing Co., 1915, FIGS. 2 and 42, pp. 142–145.

WILLIAM F. O'DEA, Primary Examiner

F. D. SHOEMAKER, Assistant Examiner

U.S. Cl. X.R.

74—538